(12) United States Patent  (10) Patent No.: US 7,808,133 B1
Widdowson et al.  (45) Date of Patent: Oct. 5, 2010

(54) DUAL-AXIS PLANAR MOTOR PROVIDING FORCE CONSTANT AND THERMAL STABILITY

(75) Inventors: Gary Peter Widdowson, Mid Levels (HK); Wai Chuen Gan, Kowloon (HK)

(73) Assignee: ASM Assembly Automation Ltd., Hong Kong (HK)

( * ) Notice: Subject to any disclaimer, the term of this patent is extended or adjusted under 35 U.S.C. 154(b) by 0 days.

(21) Appl. No.: 12/427,224

(22) Filed: Apr. 21, 2009

(51) Int. Cl.
 *H02K 41/02* (2006.01)
(52) U.S. Cl. ............... 310/12.05; 310/12.16; 310/12.24
(58) Field of Classification Search ............. 310/12.05, 310/12.16, 12.21–12.24, 13
 See application file for complete search history.

(56) References Cited

U.S. PATENT DOCUMENTS

| | | | | |
|---|---|---|---|---|
| 4,626,749 A | * | 12/1986 | Asakawa | 318/135 |
| 4,890,023 A | * | 12/1989 | Hinds et al. | 310/12.15 |
| 5,808,379 A | * | 9/1998 | Zhao | 310/12.24 |
| 5,962,937 A | * | 10/1999 | Wavre | 310/12.05 |
| 6,713,900 B2 | * | 3/2004 | Yamada | 310/12.05 |
| 6,943,464 B2 | * | 9/2005 | Hol et al. | 310/12.05 |
| 6,949,845 B2 | | 9/2005 | Oisugi et al. | |
| 7,075,197 B2 | * | 7/2006 | Korenaga | 310/12.05 |
| 7,602,087 B2 | * | 10/2009 | Widdowson et al. | 310/12.24 |
| 2004/0207269 A1 | * | 10/2004 | Johan Hol et al. | 310/12 |
| 2008/0246348 A1 | | 10/2008 | Angelis et al. | |

\* cited by examiner

*Primary Examiner*—Thanh Lam
(74) *Attorney, Agent, or Firm*—Ostrolenk Faber LLP

(57) ABSTRACT

A motor is provided comprising a magnet assembly having two rows of magnets arranged along a first axis, which are separated by a gap for generating magnetic flux lines between the rows of magnets. The motor further comprises a coil bracket which is located within the gap between the two rows of magnets. The coil bracket includes a first set of coils arranged along the first axis that are operative to drive movement of the coil bracket relative to the magnet assembly along the first axis. A second set of coils arranged along the first axis are operative to drive movement of the coil bracket relative to the magnet assembly along a second axis which is orthogonal to the first axis between a first end position and a second end position along the second axis. The first set of coils is fully located within the flux lines generated by the magnet assembly at both the first and second end positions of the coil bracket and the second set of coils is located at least partially outside the flux lines generated by the magnet assembly at the second end position of the coil bracket.

11 Claims, 3 Drawing Sheets

DUAL-AXIS PLANAR MOTOR PROVIDING FORCE CONSTANT AND THERMAL STABILITY

FIELD OF THE INVENTION

The invention relates to motors for positioning objects, and in particular to a planar motor which provides at least two degrees of freedom.

BACKGROUND AND PRIOR ART

Multi-phase linear electromagnetic motors generally comprise a row of permanent magnets to generate magnetic flux. Induction coils or phase coils are arranged facing the magnets and in directions that are transverse to the flux lines generated by the magnets. A typical multi-phase linear motor for driving a motion stage may have two or three coils arranged longitudinally, in such a way as to be arranged in line with the motion directions of the motion stage. Hence, the coils are arranged parallel to the motion direction. In a two-phase motor where there are two sets of phase coils, the two phase currents are mutually offset by 90°. In a three-phase motor, the three phase currents are mutually offset by 120°.

A planar motor which comprises linear drivers may drive motion along two chosen motion axes independently such as a main axis or X-axis, and an auxiliary or Y-axis orthogonal to the X-axis. Typically, such a dual-axis planar motor providing independent motion control requires two sets of phase coils, two sets of magnets and two motor drivers. An example of a planar motor which drives motion along both the X-axis and the Y-axis is U.S. Pat. No. 6,949,845 B2 entitled "Planar Motor" which discloses a planar motor providing highly accurate positioning by disposing X-axis and Y-axis coreless type linear motors on the same plane. Two pairs of permanent magnets are disposed orthogonally with respect to two orthogonal motion axes of a movable stage. The permanent magnets generate magnetic flux lines in directions which are perpendicular to a surface of the movable stage. Two pairs of coils are provided such that they oppose and match the two pairs of permanent magnets. This form of planar motor needs two separate sets of coils and magnets, which is therefore not cost-effective in terms of the components required. It also requires two motor drivers in order to provide independent control along the two orthogonal axes. Furthermore, the temperature of the motor fluctuates when the motion profile is changed or the motor stops. When the planar motor runs for a prolonged period, the mechanical components expand and cause thermal drift. This results in inaccurate positioning operation of the planar motor along the two axes of motion.

US Patent Application Publication Number 2008/0246348 A1 entitled "Ironless Magnetic Linear Motors Having Levitating And Transversal Force Capacities" discloses a planar motor which uses one set of three coils and one set of magnets to generate forces along the X-axis, Y-axis and Z-axis to bring about motion along each axis. The forces acting along the respective axes can be controlled independently. However, during the Z-axis motion, an overlap portion between the magnets and the three coils changes along the Z-axis, hence changing the force constant for driving the coils in the X-axis. Thus, although fewer components are required compared to the planar motor described in the abovementioned US patent, the force constant of the main travel axis changes with concurrent movement of the coils along the auxiliary axis. This ultimately affects the positioning control performance of the planar motor. Furthermore, the temperature of the planar motor cannot be kept constant which results in thermal drift and contributes to inaccurate positioning control.

It is therefore desirable to devise a planar motor providing concurrent motion along two orthogonal axes that has improved positioning control.

SUMMARY OF THE INVENTION

It is thus an object of the invention to seek to provide a planar motor with thermal stability which is capable of generating motion along two axes simultaneously while minimizing changes to the force constant as well as reducing thermal drift.

Accordingly, the invention provides a motor comprising: a magnet assembly having two rows of magnets arranged along a first axis, the two rows of magnets being separated by a gap for generating magnetic flux lines between the rows of magnets; a coil bracket which is located within the gap between the two rows of magnets, the coil bracket further including a first row of coils arranged along the first axis that are operative to drive movement of the coil bracket relative to the magnet assembly along the first axis and a second row of coils arranged along the first axis that are operative to drive movement of the coil bracket relative to the magnet assembly along a second axis which is orthogonal to the first axis, the coil bracket being movable between a first end position and a second end position along the second axis; wherein the first set of coils is configured to be fully located within the flux lines generated by the magnet assembly at both the first and second end positions of the coil bracket and the second set of coils is configured to be located at least partially outside the flux lines generated by the magnet assembly at the second end position of the coil bracket.

It will be convenient to hereinafter describe the invention in greater detail by reference to the accompanying drawings, which illustrate one embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of one preferred embodiment of the invention when considered with the accompanying drawings, in which.

DETAILED DESCRIPTION OF THE DETAILED EMBODIMENT OF THE INVENTION

Figure 1:
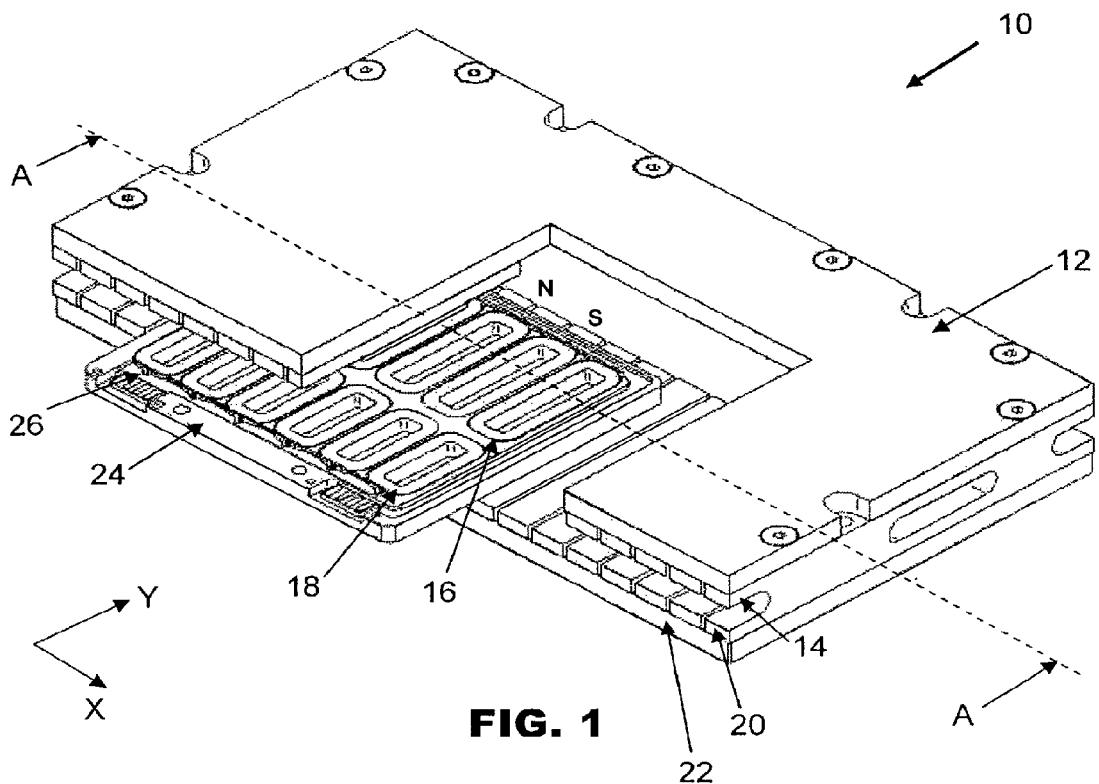
FIG. 1 is an isometric view of a multi-phase planar motor according to the preferred embodiment of the invention with a portion of a top mount and a first row of magnets removed to reveal first and second sets of coils of a coil bracket.

FIG. 1 is an isometric view of a multi-phase planar motor 10 according to the preferred embodiment of the invention with a portion of a top mount 12 and a first row of magnets 14 removed to reveal first and second sets of coils 16, 18 of a coil bracket 24. The planar motor 10 generally comprises the coil bracket 24 and a magnet assembly. The magnet assembly has first and second rows of magnets 14, 20 arranged along a first or X-axis and separated by a gap for generating magnetic flux lines between the rows of magnets. The first row of magnets 14 is mounted on the top mount 12 and the second row of magnets 20 is mounted on a bottom mount 22. Each row of magnets 14, 20 forms a continuous permanent magnetic track along the length of the top mount 12 and bottom mount 22 for guiding the movement of the coil bracket 24 located within the gap between the two rows of magnets 14, 20.

The first set of coils 16 is arranged along the X-axis corresponding to the length of the top and bottom mounts 12, 22 and drives movement of the coil bracket 24 relative to the magnet assembly along the X-axis. The second set of coils 18 is also arranged along the X-axis and drives movement of the coil bracket 24 relative to the magnet assembly along a second axis or Y-axis, which is perpendicular to the X-axis. Although it is preferred that the coil bracket 24 is movable while the first and second rows of magnets 14, 20 are relatively stationary, the first and second rows of magnets 14, 20 may be movable instead while the coils are kept relatively stationary.

The X-axis is generally located along a relatively longer travel distance of the coil bracket 24 than the Y-axis and may be referred to as the main axis of travel of the planar motor 10. The first and second sets of coils 16, 18 may be transported along the Y-axis, which may also be referred to as the auxiliary axis, and this permits a relatively shorter travel distance as compared to the main axis. A temperature sensor 26 comprising a thermocouple for providing temperature feedback regarding the coils 16, 18 may be located alongside one of the coils 16, 18. There may also be a plurality of other temperature sensors 26 on the coils 16, 18 for thermal detection and control purposes.

Figure 2:
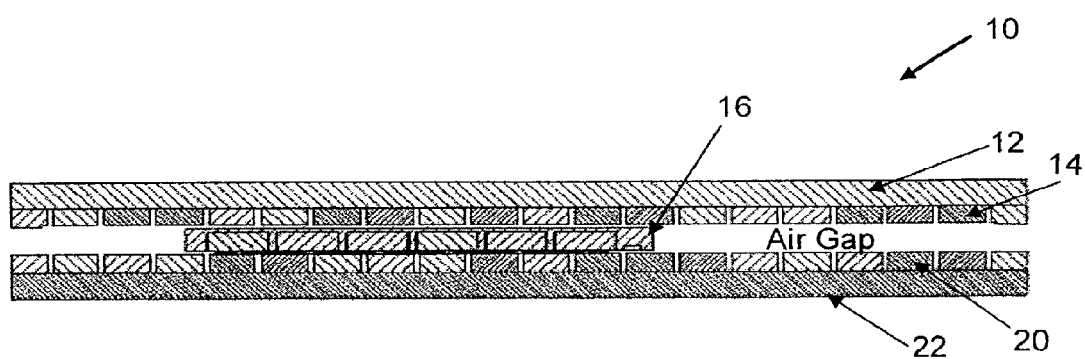
FIG. 2 is a cross-sectional view of the planar motor seen along sectional line A-A of FIG. 1 which illustrates the arrangement of the coils between two rows of magnets.

FIG. 2 is a cross-sectional view of the planar motor 10 seen along sectional line A-A of FIG. 1 which illustrates the arrangement of the coils 16, 18 between the two rows of magnets 14, 20. The two sets of coils 16, 18 are coplanar with each other and the coils are positioned on the coil bracket 24 at the same height away from the bottom mount 22. The coils are also separated at equal distances from the first and second rows of magnets 14, 20 by respective air gaps.

Figure 3:
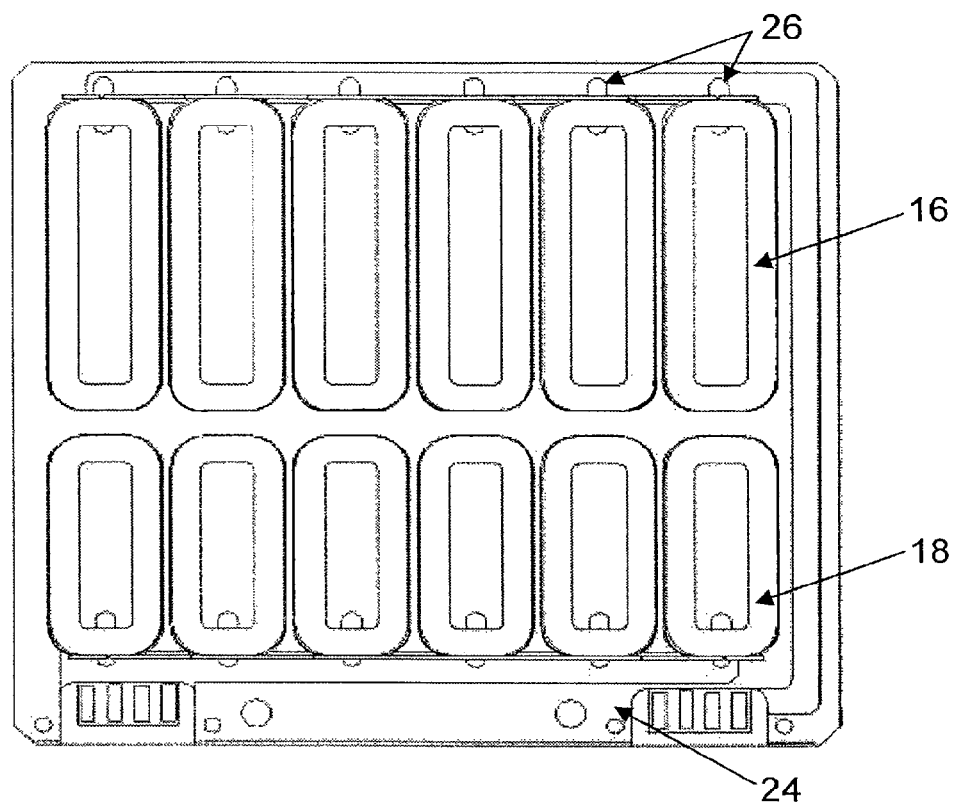
FIG. 3 is a plan view of the two sets of coils of the planar motor of FIG. 1 illustrating the arrangement of the first set of coils relative to the second set of coils.

FIG. 3 is a plan view of the two sets of coils 16, 18 of the planar motor 10 of FIG. 1 illustrating the arrangement of the first set of coils 16 relative to the second set of coils 18. The planar motor can be a multiphase motor such as a three-phase servo motor having two three-phase motor drivers, one for driving the motor 10 along each of the X-axis and the Y-axis. In a three-phase planar motor shown in FIG. 3, two coils are preferably used for each phase. Thus, there are a total of six coils in each set of coils. The number of coils in each phase may vary, such that each phase may comprise one coil or three coils instead. The six coils in the first set of coils 16 are connected to one another to generate an actuating force in the X-axis. The six coils in the second set of coils 18 are connected to one another to generate an actuating force in the Y-axis. The coils in each phase may be connected in series or in parallel. Some of the coils in each phase may also be connected in series and some in parallel. In a three-phase planar motor, the coils may be connected in a star or a delta connection. Therefore, with the aforesaid construction, the planar motor 10 is movable along the X-axis and the Y-axis independently.

The temperature sensors 26 are located at one end of the coils of the first and second sets of coils 16, 18 and may be embedded within the coil bracket 24 in contact with the coils. There are no restrictions to the number of temperature sensors 26 that can be used and the temperature sensors 26 can be located at any position relative to the coils of the planar motor 10, although the readings would generally be more accurate the closer they are to the coils 16, 18.

Figure 4:
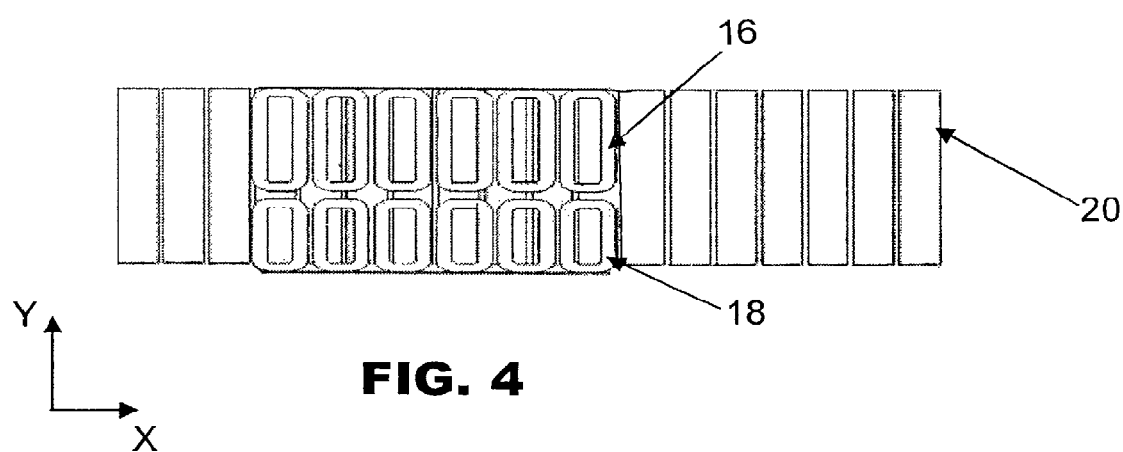
FIGS. 4 and 5 are plan views of the two sets of coils of the planar motor of FIG. 1 illustrating the displacement of the coils relative to a row of magnets located below the coils.
Figure 5:
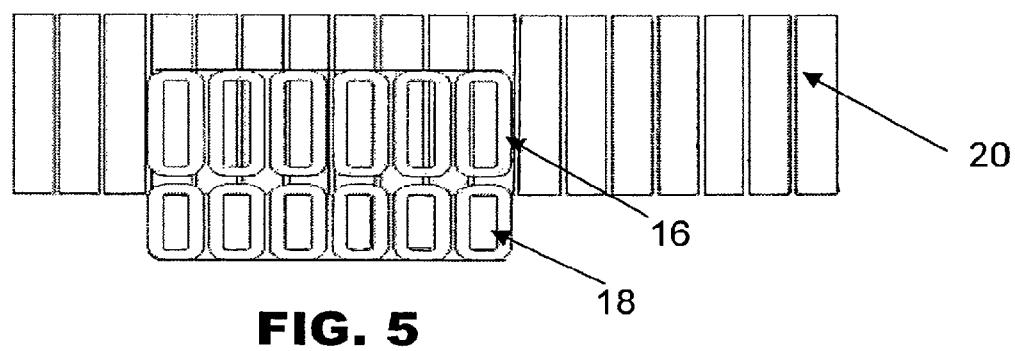

FIGS. 4 and 5 are plan views of the two sets of coils 16, 18 of the planar motor of FIG. 1 illustrating the displacement of the coils relative to a row of magnets 20 located below the coils 16, 18. The coil bracket 24 is movable between a first end position and a second end position along the second or Y-axis. FIG. 4 shows the coil bracket 24 at the first end position where the first and second sets of coils 16, 18 are positioned close to one end of the second row of magnets 20 so that both the first and second sets of coils 16, 18 are substantially overlapping the second row of magnets 20 along the auxiliary or Y-axis. This is the most extreme position of the second set of coils 18 along the auxiliary axis within the first and second rows of magnets 14, 20. The first set of coils 16 is fully located within the flux lines generated by the magnet assembly and the second set of coils 18 is almost completely located in the flux lines.

In FIG. 5, when the coil bracket 24 is at the second end position, the first and second sets of coils 16, 18 are shown displaced furthest from the said end of the second row of magnets 20 along the auxiliary or Y-axis. The first set of coils 16 remains fully located within the flux lines generated by the magnet assembly while the second set of coils 18 is located at least partially outside the flux lines. Thus, the second set of coils 18 are at their most extreme position away from the first and second rows of magnets 14, 20 along the auxiliary or Y-axis.

Hence, at both the first and second positions of the coil bracket 24, the first set of coils 16 is completely located between the first and second rows of magnets 14, 20. That is, the first set of coils 16 is enclosed completely on two sides by the first and second rows of magnets 14, 20. Consequently, the force constant experienced by the first set of coils 16 is not affected by the movement of the coils 16, 18 along the auxiliary axis, and the force constant for driving movement of the coils along the main axis therefore remains stable.

The force along the auxiliary axis and the force along the main axis can be controlled independently by using two separate currents to provide simultaneous movement along both axes. Furthermore, heat generated as a result of the actuation of the planar motor 10 can be controlled separately by providing another thermal control current. This is illustrated from the mathematical equations concerning the force and heat generation along the main and the auxiliary axes as follows:

Main Axis:

$$f_{x_1} = i_{a_1} k_x \cos x + i_{b_1} k_x \cos\left(x - \frac{2\pi}{3}\right) + i_{c_1} k_x \cos\left(x + \frac{2\pi}{3}\right)$$

where $f_{x_1}$ is the main axis force, x is the X-axis position, $i_{a_1}$, $i_{b_1}$, $i_{c_1}$ are the three phase coil currents of the first set of coils 16, and $k_x$ is the main axis force constant.

Auxiliary Axis $$f_{y_2} = i_{a_2}k_y\sin x + i_{b_2}k_y \sin\left(x - \frac{2\pi}{3}\right) + i_{c_2}k_y\sin\left(x + \frac{2\pi}{3}\right)$$

where $f_{y_2}$ is the auxiliary axis force, $i_{a_2}$, $i_{b_2}$, $i_{c_2}$ are the three phase coil currents of the second set of coils 18, and $k_y$ is the auxiliary axis force constant.

For the main axis, if one sets $$i_{a_1} = I_{q_1}\cos x, i_{b_1} = I_{q_1}\cos\left(x - \frac{2\pi}{3}\right), i_{c_1} = I_{q_1}\cos\left(x + \frac{2\pi}{3}\right)$$

where $I_{q_1}$ is a control variable, then $f_{x_1} = k_x I_{q_1}$.

Furthermore, if one sets $$i_{a_1} = I_{d_1}\sin x, i_{b_1} = I_{d_1}\sin\left(x - \frac{2\pi}{3}\right), i_{c_1} = I_{d_1}\sin\left(x + \frac{2\pi}{3}\right),$$

where $I_{d_1}$ is a control variable, then $f_{x_1} = 0$.

Therefore, $I_{d_1}$ can be used to generate heat without any force, while $I_{q_1}$ can be used to generate the required force.

For the auxiliary axis, if one sets $$i_{a_2} = I_{q_2}\sin x, i_{b_2} = I_{q_2}\sin\left(x - \frac{2\pi}{3}\right), i_{c_2} = I_{q_2}\sin\left(x + \frac{2\pi}{3}\right),$$

where $I_{q_2}$ is a control variable, then $f_{y_2} = k_y I_{q_2}$.

From the above equations, the force at the main axis and the force at the auxiliary axis may be controlled independently using $I_{q_1}$ and $I_{q_2}$ respectively. Heating of the planar motor can be controlled independently using $I_{d_1}$. Thus, heat generation can be controlled such that during force generation, heat generation is reduced. This minimizes thermal drift which may result in inaccurate positioning using the planar motor 10.

Figure 6:
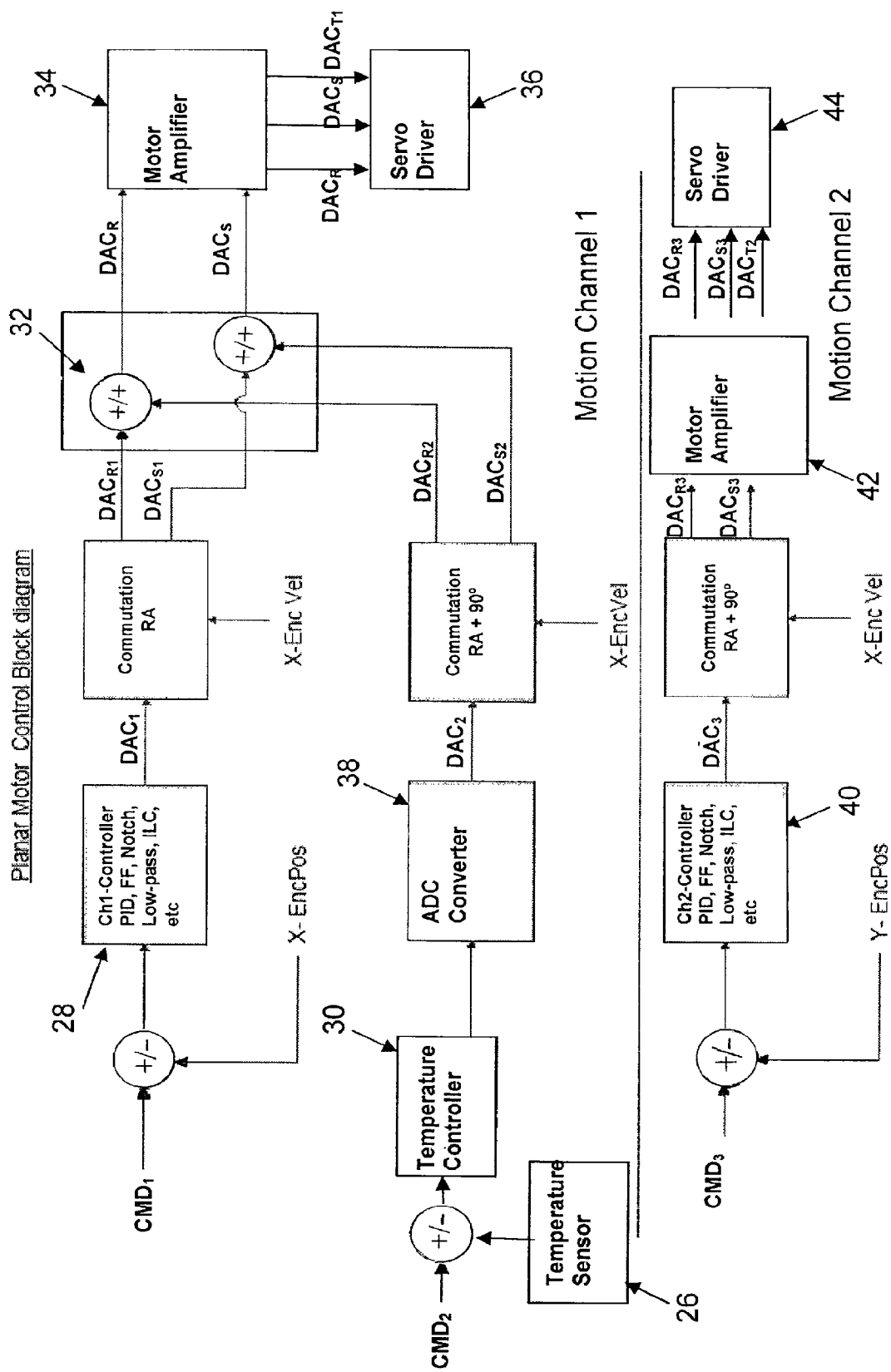
FIG. 6 is a block diagram illustrating a motion and temperature control system for maintaining thermal stability of the planar motor of FIG. 1.

FIG. 6 is a block diagram illustrating a motion and temperature control system for maintaining thermal stability of the planar motor 10 of FIG. 1. Two motion channels 1, 2 control the movement of the planar motor 10 along the X-axis and the Y-axis respectively. A motion current command CMD$_1$ from a first motion current generator, as moderated by a positional feedback signal from a linear encoder regarding a position of the coil bracket 24 mounted to the planar motor 10, is transmitted to a first motion controller 28 connected to the linear encoder. The first motion controller 28 is connected to the first motion current generator for producing a first motion current to drive the first set of coils 16 and hence the coil bracket 24 to move along the X-axis. The first motion controller 28 may comprise a Proportional Integral Derivative (PID), Feed Forward (FF), Notch filter, lower-pass filter, iterative learning control (ILC) controller and/or other control algorithms as required for accurate positioning of the planar motor 10.

The first motion controller 28 generates a current DAC$_1$ by modifying the first motion current to a commutation rotor angle which produces maximum force/torque output to the first set of coils 16. The commutation rotor angle can be calculated from the position of the coil bracket 24 as determined from the linear encoder, to drive the first set of coils 16 of the planar motor 10 to move. Two separate motion current control outputs, comprising first and second motion currents DAC$_{R1}$, DAC$_{S1}$, are then produced.

A thermal current command CMD$_2$ from a thermal current generator, as moderated by readings from a temperature sensor 26, is separately transmitted to a temperature controller 30 which is connected to the thermal current generator. The temperature sensor 26 is connected to the temperature controller 30. The temperature sensor 26 determines a temperature of the coils 16, 18 and provides temperature feedback regarding the coils to the temperature controller 30. The temperature controller 30 processes signals from the temperature feedback using thermal control algorithms and outputs a heating control signal to an analog-to-digital converter (ADC converter) 38. The ADC converter 38 generates a current DAC$_2$, which is a thermal current to dissipate heat in the coil bracket 24 for controlling the temperature of the coil bracket 24 without producing any corresponding movement. Alternatively, a temperature controller is not required by keeping the currents DAC$_1$, DAC$_2$ and DAC$_3$ constant in an open loop thermal control.

The temperature controller 30 modifies the thermal current to be out of phase with the commutation rotor angle by 90° so as not to produce a motion force/torque to the first set of coils 16 to which it is connected. Thus, the temperature controller 30 controls a magnitude of the thermal current suitable for maintaining thermal stability of the coil bracket 24.

Two separate thermal current control outputs, comprising first and second thermal currents DAC$_{R2}$, DAC$_{S2}$, are produced corresponding to the first and second motion currents DAC$_{R1}$, DAC$_{S1}$, and the thermal currents DAC$_{R2}$, DAC$_{S2}$ are separated at an electrical angle of 90° with respect to the motion currents DAC$_{R1}$, DAC$_{S1}$. There is a sine relationship between the electrical angle and the force produced, so that the maximum force is produced when the electrical angle is at, say 90°, 270°, etc. Since the first and second motion currents DAC$_{R1}$, DAC$_{S1}$ are at a commutation rotor angle which produces the maximum force/torque, the first and second thermal currents DAC$_{R2}$, DAC$_{S2}$, being at a 90° electrical separation from the motion currents (i.e. 180°, 360°, etc) would produce no force/torque. Therefore, the first and second thermal currents DAC$_{R2}$, DAC$_{S2}$ will only result in heat dissipation to increase the temperature of the first set of coils 16, but will not drive motion of the coil bracket 24.

The pairs of motion and thermal currents DAC$_{R1}$, DAC$_{R2}$ and DAC$_{S1}$, DAC$_{S2}$ respectively are received by a summation controller 32 for summation of the respective pairs of currents as shown in FIG. 6. If the thermal current is connected to the first set of coils 18, the summation controller 32 separately combines the first motion current DAC$_{R1}$ with the first thermal current DAC$_{R2}$ to give a combined current output DAC$_R$ to the first set of coils 16. The summation controller 32 also combines the second motion current DAC$_{S1}$ with the second thermal current DAC$_{S2}$. The two separate combined current outputs DAC$_R$ and DAC$_S$ that result are received and amplified by a first motor amplifier 34.

As the motor is a three-phase motor, a third current command DAC$_{T1}$ should be computed by the first motor amplifier 34 which is out of phase with the two separate combined current outputs, such that the summation of the third current output generated by the current command DAC$_{T1}$ and the resultant combined current outputs DAC$_R$ and DAC$_S$ would be equal to zero. All three current outputs DAC$_R$, DAC$_S$ and DAC$_{T1}$ are then sent to a first servo driver 36 for driving the coil bracket 24 to move along the X-axis and regulating the heat generated for the planar motor 10. In summary, motion control outputs $DAC_{R1}$, $DAC_{S1}$, are used to primarily produce a motion force for the coil bracket 24 to move with low power dissipation, and the thermal control outputs $DAC_{R2}$ and $DAC_{S2}$ are used to produce high power dissipation for heating when the coil bracket 24 is moving at lower speeds or is stationary.

A motion current command $CMD_3$ from a motion current generator, is moderated by a positional feedback signal from the same linear encoder which provides positional information of the X-axis. The motion current command $CMD_3$ is transmitted to a second motion controller 40 connected to the linear encoder. The second motion controller 40 is connected to the second motion current generator for producing a Y-axis motion current to drive the second set of coils 18 to move along the Y-axis. As with the first motion controller 28, the second motion controller 40 may comprise a Proportional Integral Derivative (PID), Feed Forward (FF), Notch filter, lower-pass filter, iterative learning control (ILC) controller and/or other control algorithms as required for accurate positioning of the planar motor 10.

The second motion controller 40 also modifies the motion current to generate a current $DAC_3$ at a commutation rotor angle which produces maximum force/torque output to the planar motor 10. The commutation rotor angle can be calculated from the position of the coil bracket 24 as determined from the linear encoder, to drive the second set of coils 18 of the planar motor 10 to move. Two separate motion current control outputs, comprising first and second Y-axis motion currents $DAC_{R3}$, $DAC_{S3}$, are then produced and are received and amplified by a second motor amplifier 42. As the motor is a three-phase motor, a third current command $DAC_{T2}$ should be computed by the second motor amplifier 34 which is out of phase with the two separate combined current outputs, such that the summation of the third current output generated by the current command $DAC_{T2}$ and the resultant combined current outputs $DAC_{R3}$ and $DAC_{S3}$ would be equal to zero. All three current outputs $DAC_{R3}$, $DAC_{S3}$ and $DAC_{T2}$ are then sent to a second servo driver 44 for driving the coil bracket 24 to move along the Y-axis.

It would be appreciated that the preferred embodiment of the invention provides a low cost but highly reliable control system for a dual-axis planar motor since only one set of magnets 14, 20 is required as compared to the conventional prior art approach described above. Simultaneous motion along the main travel axis and the auxiliary axis are possible by using separate currents to generate each motion while keeping the force constant along the main travel axis constant. Heat generation control is separated from motion generation control so that thermal stability is achieved and thermal drift resulting in expansion of the components of the motor 10 can be minimized. More accurate positioning of the coil bracket 24 comprised in the planar motor 10 may therefore be produced.

The invention described herein is susceptible to variations, modifications and/or additions other than those specifically described and it is to be understood that the invention includes all such variations, modifications and/or additions which fall within the spirit and scope of the above description.

The invention claimed is:

1. A motor comprising:
  a magnet assembly having two rows of magnets arranged along a first axis, the two rows of magnets being separated by a gap for generating magnetic flux lines between the rows of magnets;
  a coil bracket which is located within the gap between the two rows of magnets, the coil bracket further including a first set of coils arranged along the first axis that are operative to drive movement of the coil bracket relative to the magnet assembly along the first axis and a second set of coils arranged along the first axis that are operative to drive movement of the coil bracket relative to the magnet assembly along a second axis which is orthogonal to the first axis, the coil bracket being movable between a first end position and a second end position along the second axis;
  wherein the first set of coils is configured to be fully located within the flux lines generated by the magnet assembly at both the first and second end positions of the coil bracket and the second set of coils is configured to be located at least partially outside the flux lines generated by the magnet assembly at the second end position of the coil bracket.

2. The motor as claimed in claim 1, wherein the first and second set of coils are located on a same plane on the coil bracket.

3. The motor as claimed in claim 1, wherein the motor comprises a three-phase motor along each of the first axis and the second axis.

4. The motor as claimed in claim 3, wherein the motor comprises two coils in each of the three phases.

5. The motor as claimed in claim 1, wherein a range of travel of the coil bracket along the second axis is substantially shorter than a range of travel of the coil bracket along the first axis.

6. The motor as claimed in claim 1, further comprising:
  a first motion current generator operative to produce a first motion current to drive the first set of coils to move;
  a thermal current generator operative to produce a thermal current to the first set of coils to dissipate heat in the coil bracket for controlling a temperature of the coil bracket without producing corresponding movement of the coil bracket;
  a summation controller operative to combine the first motion current with the thermal current, and to produce a combined current output to the first set of coils; and
  a second motion current generator operative to produce a second motion current to drive the second set of coils to move.

7. The motor as claimed in claim 6, further comprising a motion controller connected to the first motion current generator that is operative to modify the first motion current to a commutation rotor angle which produces maximum motion force/torque to the first set of coils.

8. The motor as claimed in claim 7, further comprising a linear encoder connected to the motion controller, wherein the linear encoder is operative to determine a position of the coil bracket and to provide positional feedback regarding the coil bracket to the motion controller.

9. The motor as claimed in claim 7, further comprising a temperature controller connected to the thermal current generator that is operative to modify the thermal current to be out of phase with the commutation rotor angle by 90° so as not to produce a motion force/torque to the first set of coils.

10. The motor as claimed in claim 6, further comprising temperature sensors located at one end of the coils of the first and second sets of coils connected to the temperature controller for determining a temperature of the first and second set of coils and to provide temperature feedback regarding the first and second sets of coils.

11. The motor as claimed in claim 10, wherein the temperature sensors are embedded within the coil bracket.

\* \* \* \* \*